(12) United States Patent
Enomoto et al.

(10) Patent No.: US 9,426,325 B2
(45) Date of Patent: Aug. 23, 2016

(54) DOCUMENT READING DEVICE

(71) Applicants: Shinnosuke Enomoto, Minamialps (JP); Seiji Nishizawa, Chuo (JP)

(72) Inventors: Shinnosuke Enomoto, Minamialps (JP); Seiji Nishizawa, Chuo (JP)

(73) Assignees: XEROX CORPORATION, Norwalk, CT (US); NISCA CORPORATION, Minamikoma-gun, Yamanashi-ken (JP)

( * ) Notice: Subject to any disclaimer, the term of this patent is extended or adjusted under 35 U.S.C. 154(b) by 0 days.

(21) Appl. No.: 14/424,274

(22) PCT Filed: Aug. 23, 2013

(86) PCT No.: PCT/JP2013/072563
§ 371 (c)(1),
(2) Date: Feb. 26, 2015

(87) PCT Pub. No.: WO2014/034560
PCT Pub. Date: Mar. 6, 2014

(65) Prior Publication Data
US 2015/0222777 A1 Aug. 6, 2015

(30) Foreign Application Priority Data
Aug. 27, 2012 (JP) .................. 2012-186055

(51) Int. Cl.
*H04N 1/04* (2006.01)
*H04N 1/203* (2006.01)
(Continued)

(52) U.S. Cl.
CPC ................ *H04N 1/2032* (2013.01); *B65H 5/26* (2013.01); *B65H 7/20* (2013.01); *H04N 1/123* (2013.01); H04N 1/193 (2013.01); *H04N 2201/0081* (2013.01); *H04N 2201/0442* (2013.01); *H04N 2201/0446* (2013.01)

(58) Field of Classification Search
CPC ......... H04N 1/2032; H04N 1/123; B65H 5/26

USPC ......... 358/496, 498, 483, 482, 474, 471, 505, 358/408
See application file for complete search history.

(56) References Cited

U.S. PATENT DOCUMENTS 4,803,752 A * 2/1989 Kasama ............. G03G 21/0011
101/169
6,640,082 B2 * 10/2003 Mitomi .......................... 399/374
(Continued)

FOREIGN PATENT DOCUMENTS

JP 62102658 A * 5/1987
JP H02-044856 A 2/1990
(Continued)

OTHER PUBLICATIONS

PCT, "International Search Report for International Application No. PCT/JP2013/072563".

*Primary Examiner* — Cheukfan Lee
(74) *Attorney, Agent, or Firm* — Manabu Kanesaka

(57) ABSTRACT

A document reading device is capable of preventing distortion or twisting occurring in a document conveying device from being transmitted to a reading carriage incorporated in the document conveying device. A document reading device includes a second reading carriage provided in a document conveying unit and configured to read a surface of a document different from a surface read by a first reading carriage, a support frame having a support surface supporting the second reading carriage, a retaining member retaining the second reading carriage by sandwiching the same between itself and the support frame, and an elastic member provided between the second reading carriage and retaining member to press the second reading carriage against the support frame. One of the support surface of the support frame and a supported surface of the second reading carriage supported by the support surface is formed into a curved surface.

12 Claims, 10 Drawing Sheets

(51) Int. Cl.
*H04N 1/12* (2006.01)
*H04N 1/193* (2006.01)
*B65H 5/26* (2006.01)
*B65H 7/20* (2006.01)

(56) References Cited

U.S. PATENT DOCUMENTS

| | | | |
|---|---|---|---|
| 7,202,983 B2 * | 4/2007 | Yokota et al. | 358/496 |
| 7,525,695 B2 * | 4/2009 | Akaike | 358/471 |
| 8,896,889 B2 * | 11/2014 | Chun et al. | 358/474 |
| 2002/0098023 A1 | 7/2002 | Mitomi | |
| 2003/0053148 A1 * | 3/2003 | Matsumoto | 358/474 |
| 2003/0231360 A1 * | 12/2003 | Jo | 358/500 |
| 2011/0188101 A1 * | 8/2011 | Tsujimura | 358/498 |
| 2013/0182273 A1 * | 7/2013 | Lee et al. | 358/1.13 |

FOREIGN PATENT DOCUMENTS

| | | |
|---|---|---|
| JP | H02-268560 A | 11/1990 |
| JP | 2008-162775 A | 7/2008 |
| JP | 2011-124785 A | 6/2011 |

\* cited by examiner

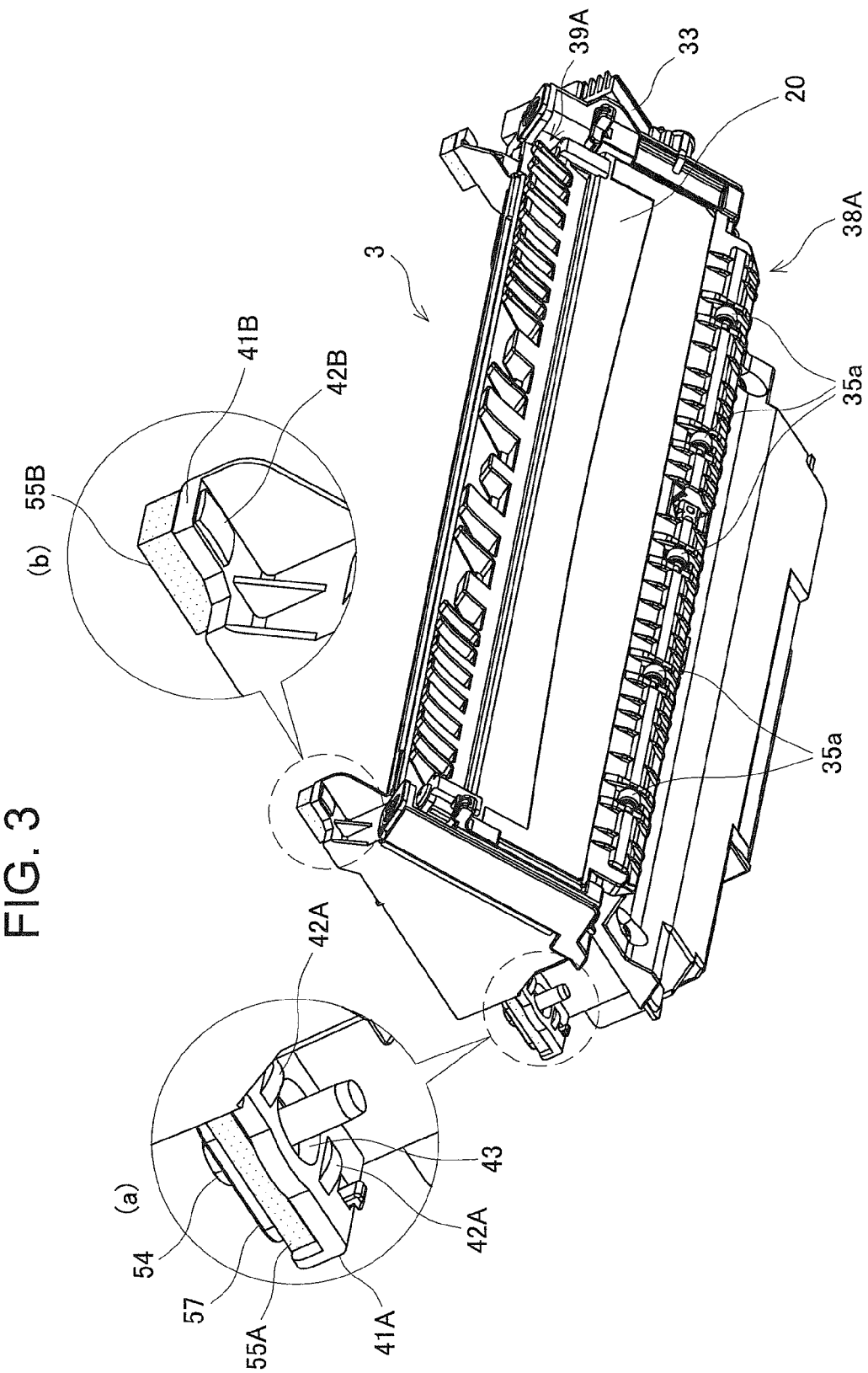

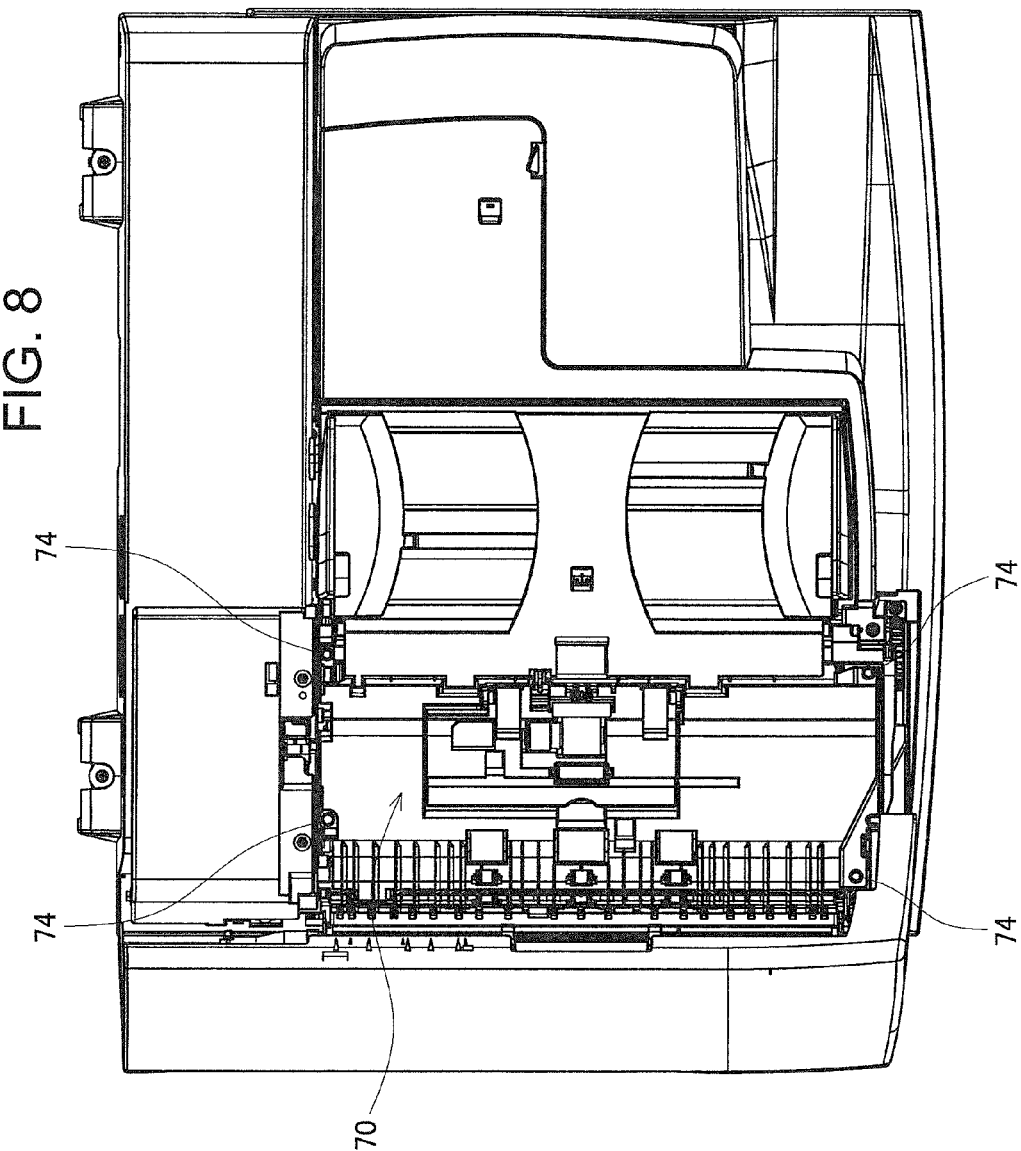

DOCUMENT READING DEVICE

RELATED APPLICATIONS

The present application is National Phase of International Application No. PCT/JP2013/072563 filed Aug. 23, 2013, and claims priority from Japanese Application No. 2012-186055, filed Aug. 27, 2012, the disclosure of which is hereby incorporated by reference herein in its entirety.

TECHNICAL FIELD

The present invention relates to a document reading device that reads both sides of a document and, more particularly, to a document reading device provided with a document conveying device having a reading section for reading one side of a document the other side of which has been read.

BACKGROUND ART

Conventionally, as a document reading device that reads a double-sided document with images formed on both sides thereof, there are known a device including a document conveying device having a reversing mechanism for reversing the document and configured to conveying the document to a reading section for reading one side of the document, reversing the document using the reversing mechanism, and conveying once again the document to the reading section for reading the other side of the document, and a device including two first and second reading sections for reading one side of the document and the other side thereof, respectively.

In document reading devices that read both sides of the document using such two reading sections, there is known a device having a configuration in which the first reading section is provided at a document reading device main body side, and the second reading section is provided inside a U-shaped document conveying path (refer to, for example, Patent Documents 1 and 2).

CITATION LIST

Patent Document

[Patent Document 1] Jpn. Pat. Appln. Laid-Open Publication 2008-162775

[Patent Document 2] Jpn. Pat. Appln. Laid-Open Publication 2011-124785

DISCLOSURE OF THE INVENTION

Problems to be Solved by the Invention

Normally, the document conveying device provided in the document reading device as described above is configured to be openable/closable with respect to an upper surface of a document reading device main body so as to allow a document placed on a contact glass for book reading to be read. Specifically, the document conveying device placed on the upper surface of the document reading device main body is pivotally supported by the document reading device main body with a hinge disposed at a rear side as a supporting point, whereby it is possible to open/close the document conveying device by manually turning a front side thereof in a vertical direction.

Since the document conveying device can be turned with respect to the rear side of the document reading device main body as described above, the document conveying device assumes a slant posture every time it is in an opened state. Therefore, every time the document conveying device is opened/closed, distortion or twisting occurs inevitably. Accordingly, the second reading section (reading carriage) incorporated in the document conveying device is also subject to distortion or twisting.

FIGS. 10A and 10B are exemplary views each illustrating a mounting manner of the second reading carriage to the document conveying device in a conventional document reading device. As illustrated in FIG. 10A, a support frame (side plate) 151 of the document conveying device has a support portion 152 that protrudes therefrom so as to support a second reading carriage 103. On the other hand, the second reading carriage 103 has a mounting portion 141 that abuts against the support portion 152 of the support frame 151 so as to be fixedly supported by the support portion 152. Although not illustrated, a screw hole is formed in the support portion 152 and the mounting portion 141, and the second reading carriage 103 is placed on the support portion 152 of the support frame 151 via the mounting portion 141 and is fixed to the support frame 151 by a screw 154.

When distortion or twisting occurs in such a document conveying device, a position of the support portion 152 of the support frame 151 is changed (FIG. 10B). In this case, since the second reading carriage 103 is fixed to the support frame 151 by the screw 154 with a support surface of the support portion 152 and a mounting surface of the mounting portion 141, which are both planes, brought into surface contact with each other, the distortion or twisting is transmitted to the second reading carriage 103 as illustrated in FIG. 10B, even if a change h of a support position of the support frame 151 is very small. When the distortion or twisting is applied to the reading carriage 103, a position of an optical component such as mirrors disposed inside the reading carriage 103 is deviated to generate deviation in an optical axis, which may adversely affect a read image.

Particularly, in recent years, rigidness of the document conveying device tends to be lowered for responding to required reduction in weight or thickness of the document conveying device or simplification of the structure thereof and, thus, the distortion or twisting accompanying the opening/closing of the document conveying device is more likely to occur.

In view of the above situation, an object of the present invention is to provide a document reading device capable of preventing distortion or twisting occurring in the document conveying device from being transmitted to a reading carriage incorporated in the document conveying device.

Means for Solving the Problems

To solve the above problem, according to the present invention, there is provided a document reading device that includes a document conveying unit and a document reading unit, the document conveying unit including a sheet supply tray on which a document is placed, a sheet discharge tray housing the document, and a document conveying path extending from the sheet supply tray to the sheet discharge tray and being configured to be openable/closable with respect to the document reading unit, the document reading unit including a first reading carriage that reads the document conveyed by the document conveying unit, wherein the document conveying unit further includes: a second reading carriage that reads a surface of the document different from a surface read by the first reading carriage; a support frame having a support surface that supports the second reading carriage; a retaining member that retains the second reading carriage by sandwiching the same between itself and the support frame; and an elastic member provided between the second reading carriage and the retaining member so as to press the second reading carriage against the support frame, and one of the support surface of the support frame and a supported surface of the second reading carriage that is supported by the support surface is formed into a curved surface.

A positioning pin for positioning the second reading carriage is provided in the support frame, and the positioning pin is inserted through an insertion hole formed at an end portion of the second reading carriage in a short length direction for positioning of the second reading carriage.

The document reading device further includes a first reading section that reads the document by means of the first reading carriage, a second reading section that reads the document by means of the second reading carriage on a downstream side of the first reading section, a first roller pair disposed between the first and second reading sections, and a second roller pair disposed downstream of the second reading section, wherein a conveying guide member that forms a document conveying path extending from the first roller pair to the second roller pair through the second reading section is provided in the second reading carriage.

The conveying guide member includes a contact glass provided in the second reading carriage and a swing guide member disposed facing the contact glass and biased toward the contact glass by a biasing member.

Advantages of the Invention

According to the present invention, even when distortion or twisting occurs in the document conveying device, it is possible to stably retain the reading carriage of the document conveying device without transmitting the distortion or twisting to the reading carriage.

BRIEF DESCRIPTION OF THE DRAWINGS

FIG. 3 is a perspective of the second reading carriage illustrated in FIG. 1 as viewed from below.

FIG. 8 is an exemplary top view illustrating the document reading device of FIG. 1 in a state where the sheet feed cover unit is removed.

BEST MODE FOR CARRYING OUT THE INVENTION

Figure 1:
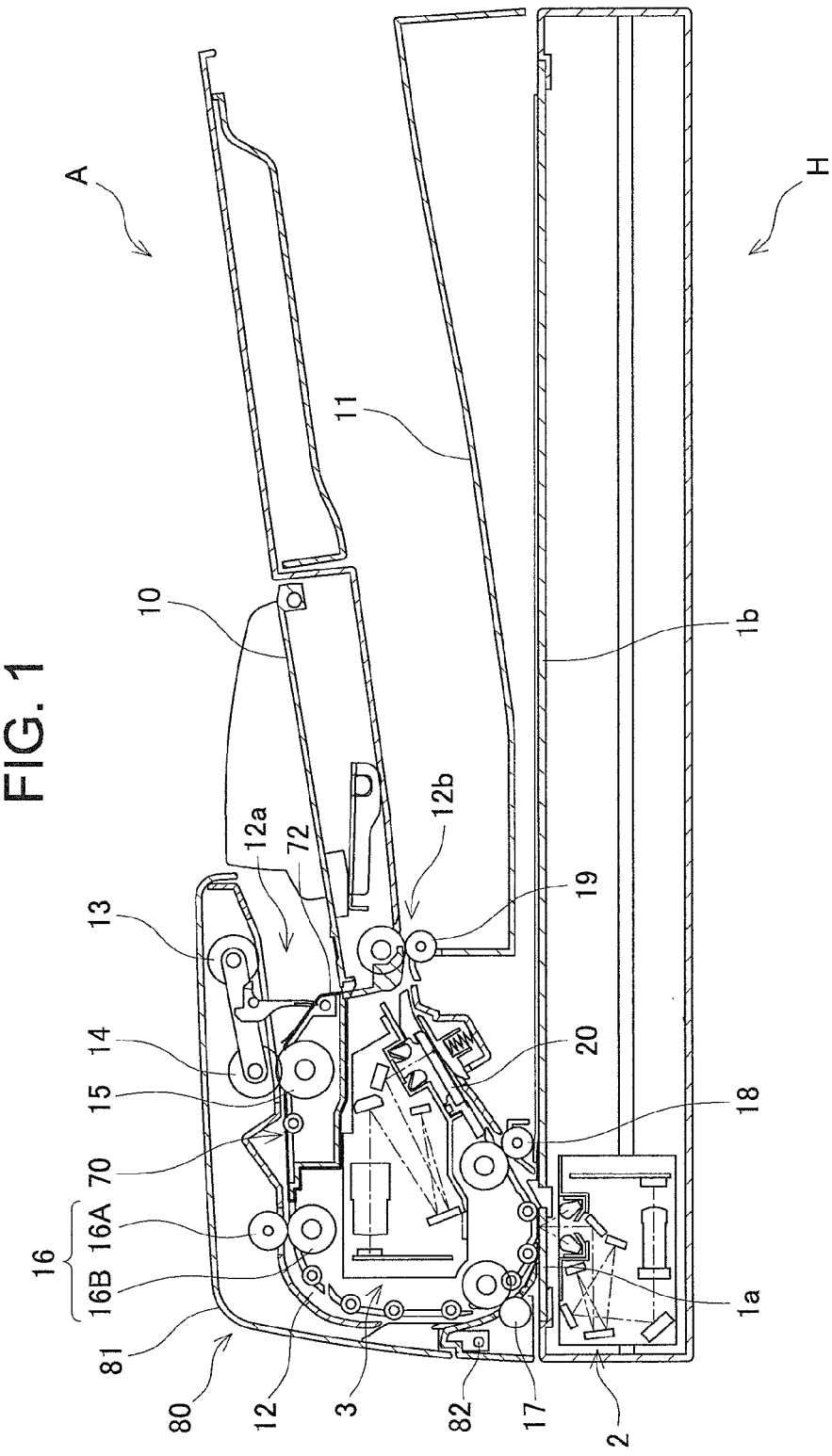
FIG. 1 is a cross-sectional view illustrating an entire configuration of a document reading device according to an embodiment of the present invention.

A document reading device according to the present invention will be described below. FIG. 1 is a cross-sectional view illustrating an entire configuration of a document reading device according to an embodiment of the present invention.

As illustrated in FIG. 1, the document reading device includes a document reading device main body (document reading unit) H and a document conveying device (document conveying unit) A that conveys a document. The document conveying device A is mounted to the document reading device main body H through a not illustrated hinge. The document conveying device A is supported by the hinge so as to be openable/closable with respect to an upper surface of the document reading device main body H.

The document reading device main body H incorporates a first reading carriage 2 having a first reading section that reads one side of a document conveyed on an upper surface of a contact glass 1a by the document conveying device A. The document conveying device A incorporates a second reading carriage 3 having a second reading section that reads the other side of the document that has passed through the upper surface of the contact glass 1a of the main body H.

The document conveying device A is openably/closably mounted to the document reading device main body H so as to expose an upper surface of the main body H and is configured to read the document placed on a contact glass 1b of the main body H while moving the first reading carriage 2.

The first reading carriage 2 incorporated in the document reading device main body H integrally includes a photoelectric conversion means serving as the first reading section and including a light source, a plurality of mirrors, a lens, and a photoelectric conversion element (CCD). The first reading carriage 2 irradiates a conveyed document through the first contact glass 1a with light from the light source. Light reflected from the document is reflected by the mirrors and then enters the photoelectric conversion means including the CCD through the lens, where the light is subjected to photoelectric conversion for document image reading. Further, the first reading carriage 2 moves in a sub-scanning direction to thereby read an image of a thick document such as a book placed on the second contact glass 1b through opening/closing operation of the document conveying device A.

As illustrated in FIG. 1, the document conveying device A has a sheet supply tray 10 on which a plurality of documents can be placed and a sheet discharge tray 11 that houses the read document. The sheet supply tray 10 is disposed above the sheet discharge tray 11 in an overlapping manner. A regulation wall 72 that aligns leading ends of the documents placed on the sheet supply tray 10 is provided downstream of the sheet supply tray 10 so as to connect the sheet supply tray 10 and a U-shaped document conveying path 12 to be described later.

The document conveying path 12 is a U-shaped path extending from the sheet supply tray 10 up to the sheet discharge tray 11. The document conveying path 12 includes, as illustrated in FIG. 1, an upstream side path extending from a sheet supply port 12a through which the document on the sheet supply tray 10 is delivered up to a resist roller pair 16, a curved intermediate path extending, while curving, from the resist roller pair 16, through the first contact glass 1a, up to a conveying roller pair (first roller pair) 18, and a downstream side path extending from the conveying roller pair 18 up to a sheet discharge port 12b at which a discharge roller pair (second roller pair) 19 is disposed. The document conveying path 12 is formed by a conveying guide member arranged on upper and lower sides thereof.

Along the document conveying path 12, there are provided a delivery roller 13 that abuts against the document placed on the sheet supply tray 10 with its leading end aligned by the regulation wall 72 and thereby delivers the document, a feeding roller 14 that feeds the document delivered by the delivery roller 13, a separation roller 15 that is brought into pressure contact with the feeding roller 14 so as to feed the document one by one, a resist roller pair 16 (resist rollers 16A and 16B) that receives an abutment of the leading end of the document fed by the feeding roller 14 and separation roller 15 for alignment and then feeds the document downstream, a conveying roller pair 17 disposed upstream of the first contact glass 1a, a conveying roller pair (first roller pair) 18 disposed downstream of the first contact glass 1a, and a discharge roller pair (second roller pair) 19 disposed downstream of the conveying roller pair 18 and discharges the document to the sheet discharge tray 11.

The delivery roller 13, the feeding roller 14, and the resist roller 16A are unitized with a sheet feed cover 81 of the document conveying device A and a part of the outer conveying guide member at an upstream side of the document conveying path 12 to constitute a sheet feed cover unit 80. Further, the separation roller 15 and regulation wall 72 of the sheet supply tray 10 are unitized with a part of the inner conveying guide member at the upstream side of the document conveying path 12 to constitute a separation guide unit 70. Details of the sheet feed cover unit 80 and the separation guide unit 70 will be described later.

The document conveying device A incorporates the second reading section that reads a side of the document opposite to a side thereof read by the first reading section mounted on the first reading carriage 2. The second reading section is mounted on the second reading carriage 3, and the second reading carriage 3 is disposed inside the U-shaped document conveying path 12. The second reading carriage 3 has a third contact glass 20 at its end portion in a sheet discharge direction. The third contact glass 20 is disposed between the conveying roller pair (first roller pair) 18 and the discharge roller pair (second roller pair) 19. One surface of the third contact glass 20 serves as a part of the conveying guide member of the document conveying path 12. With this configuration, the second reading section reads the document passing through the surface of the third contact glass 20.

In a double-side reading mode, the document on the sheet supply tray 10 is delivered by the delivery roller 13 and fed one by one by the feeding roller 14 and separation roller 15. The fed one document is aligned by the resist roller pair 16 and conveyed to the first contact glass 1a by the conveying roller pair 17. Thereafter, the document that has passed through the first contact glass 1a is conveyed to the third contact glass 20 by the conveying roller pair 18 and discharged to the sheet discharge tray 11 by the discharge roller pair 19. In this conveyance process, a front surface of the document is read by the first reading section when the document passes through the first contact glass 1a, and a rear surface of the document is read by the second reading section when the document passes through the third contact glass 20.

Figure 2:
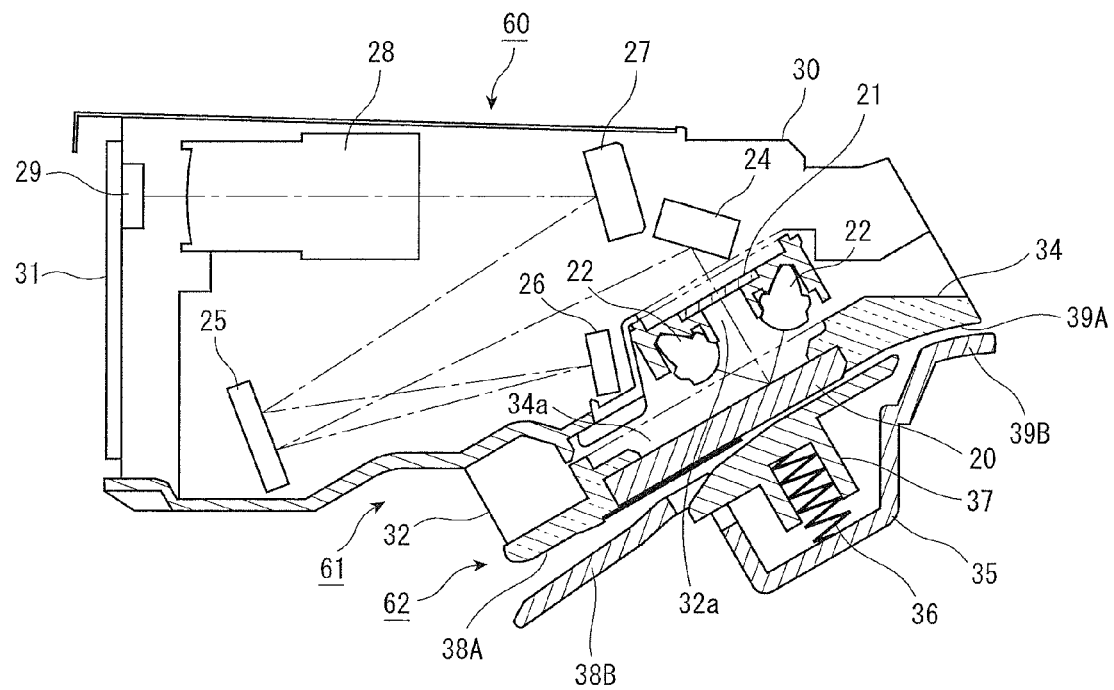
FIG. 2 is an enlarged cross-sectional view illustrating a second reading carriage of the document reading device illustrated in FIG. 1.

The following describes configurations of the second reading carriage 3 and the second reading section in the second reading carriage 3. FIG. 2 is an enlarged cross-sectional view illustrating the second reading carriage 3, and FIG. 3 is a perspective view of the second reading carriage 3 as viewed from below. Mounting portions (to be described later) of the second reading carriage 3 are illustrated in enlarged views of (a) and (b) of FIG. 3.

As illustrated in FIG. 2, the second reading carriage 3 includes a light source having an LED for irradiating the document conveyed on the contact glass 20 with light and a light guide body, a plurality of mirrors 24, 25, 26, and 27 that lead reflected light from the document in a predetermined direction, a lens 28 that converges the reflected light led by the plurality of mirrors 24, 25, 26, and 27, and a CCD (photoelectric conversion element) 29 that photoelectric-converts the light converged by the lens 28.

The second reading carriage 3 irradiates the document through the third contact glass 20 with light emitted from the light source. Light reflected from the document is reflected by the mirrors 24, 25, 26, and 27 and then enters the CCD through the lens 28, where the light is subjected to photoelectric conversion for document image reading.

The second reading carriage 3 is constituted by an optical unit 60 including the four mirrors 24, 25, 26, and 27, lens 28, and CCD 29, a light source unit 61 including the light source having the LED and light guide body 22, and a glass unit 62 having the third contact glass 20. As illustrated in FIG. 2, the optical unit 60, the light source unit 61, and the glass unit 62 are connected to each other in this order to thereby constitute the second reading carriage 3.

The optical unit 60 includes a resin first frame 30 having a substantially L-shaped cross-section and serving also as an exterior cover of the second reading carriage 3 and a CCD substrate 31 mounted with the four mirrors 24, 25, 26, and 27 which are each provided so as to extend in a document width direction perpendicular to a document conveying direction and the CCD 29.

The light source unit 61 includes a second frame 32 mounted to the first frame 30 so as to cover an inside of the first frame 30 in which the mirrors 24, 25, 26, and 27 are disposed, two light guide bodies 22 provided at one side of the second frame 32 so as to extend in the document width direction, a chip-like LED (not illustrated) that is disposed at one end side of the light guide bodies 22 in the document width direction and that emits light to be incident on the light guide bodies 22, an LED substrate (not illustrated) mounted with the LED, and a heat radiator 33 (see FIG. 3) that radiates heat generated from the LED. In a slit 32a formed in the second frame 32 so as to allow the light reflected at the document surface to be incident on the mirror 24, a protective glass 21 for protecting optical components in the carriage is disposed.

The glass unit 62 includes a third frame 34 made of resin and the third contact glass 20 mounted to a reading opening 34a formed in the third frame 34.

One surface of the third contact glass 20 constitutes a part of the conveying guide member of the document conveying path 12. Further, an upstream guide portion 38A and a downstream guide portion 39A, each of which constitutes a part of the third frame 34, are provided upstream and downstream of the third contact glass 20, respectively. Movable rollers 35a for reducing a conveying load of the document to be conveyed to the third contact glass 20 are disposed in the upstream guide portion 38A.

Although not illustrated in FIG. 3, a fourth frame 35 is disposed below the glass unit 62, that is, below the second reading carriage 3. The fourth frame 35 is disposed below the glass unit 62 with a gap allowing the document to pass therethrough provided between itself and glass unit 62. As illustrated in FIG. 2, the fourth frame 35 includes an upstream guide member 38B facing the upstream guide member 38A of the third frame and a downstream guide member 39B facing the downstream guide member 39A.

As described above, by disposing, upstream and downstream of the third contact glass 20, the guide portion 38A formed integrally with the second reading carriage 3 and the guide portion 38B formed in the fourth frame such that they face each other, it is possible to eliminate a stepped portion or a deflected portion occurring in the conveying guide member on the device side or a guide surface of the contact glass 20. This allows the document to be conveyed smoothly and stably and facilitates assembly. Particularly, even when distortion or twisting occurs in the document conveying device A to generate a slight tilt in the second reading carriage as described later, the document can be conveyed smoothly and stably.

Further, a swing guide member 37 is provided in the fourth frame 35 so as to face the third contact glass 20 and constitutes, together with the third contact glass 20, the conveying guide member of the document conveying path 12 that guides the conveyed document.

The swing guide member 37 is biased from the fourth frame 35 toward the third contact glass 20 by a biasing member 36 such as a spring member. Not illustrated projections are formed, respectively, at both end portions of the swing guide member 37 in the document width direction and are brought into contact with the third contact glass 20 by the biasing member 36. Accordingly, a constant interval is maintained between the conveying surface of the third contact glass 20 and conveying surface of the swing guide member 37. This allows the second reading section to reliably read the document.

As described above, the conveying guide member of the document conveying path 12 extending from the conveying roller pair 18 up to the sheet discharge roller pair 19 includes at least the third contact glass 20 and the swing guide member 37, and the upstream and downstream guide members 38 and 39 are disposed, respectively, upstream and downstream of the third contact glass 20 and the swing guide member 37.

By the way, the conveyed document always contacts the third contact glass 20, so that the third contact glass 20 is likely to be scratched or undergo attachment of dust. Thus, periodical maintenance is required. In order to remove the third contact glass 20, it is necessary to remove the glass unit 62 from the second reading carriage 3. However, in a conventional document reading device, when the glass unit 62 is removed from the second reading carriage 3, dust or the like may enter inside the second reading carriage 3 where the optical components such as a mirror and a lens are disposed through an opening portion (slit 32a) of the second frame 32. In order to prevent this, the protective glass 21 is provided in the slit 32a of the second frame 32. As a result, it is possible to prevent the dust and the like from entering inside the carriage without blocking an optical path.

The following describes the sheet feed cover unit 80 and the separation guide unit 70. As illustrated in FIG. 1, the document conveying device A is provided with the sheet feed cover 81 that covers the sheet supply port 12a, the document conveying path 12, the second reading carriage 3, and the like. The sheet feed cover 81 is formed integrally with the delivery roller 13, the feeding roller 14, the resist roller 16A, and outer conveying guide member at an upstream to intermediate part of the document conveying path 12 to thereby constitute the sheet feed cover unit 80. The sheet feed cover unit 80 is pivotally supported by the document conveying device A with a pivotal pin 82 as a supporting point, and it is possible to expose the upstream side of the document conveying path 12 by pivoting upward the sheet feed cover unit 80.

On the other hand, inside the sheet feed cover unit 80, the separation guide unit 70 having inside thereof the separation roller 15 is provided (thick line part of FIG. 1). The separation guide unit 70 is detachably disposed at an upper portion of the second reading carriage 3 and is fixed from above to a device side plate by screws.

As illustrated in FIG. 1, an outer surface of the separation guide unit 70 on the sheet supply port 12a side functions as the regulation wall 72 for aligning the leading ends of the documents placed on the sheet supply tray 10. Further, an upper surface of the separation guide unit 70 constitutes the inner conveying guide member at the upstream side of the document conveying path 12. Thus, the conveying guide member extending from the sheet supply tray 10 to the resist roller pair 16 can be removed together with the separation guide unit 70, whereby an opening to access the second reading carriage 3 can be secured widely for maintenance.

When the second reading carriage 3 is removed, the sheet feed cover unit 80 is pivoted about the pivotal pin 82 to expose the document conveying path 12. Then, the separation guide unit 70 is removed from the exposed document conveying path 12. As a result, it is possible to pull out the second reading carriage 3 for removal through an opening portion through which the separation guide unit 70 is removed.

Figure 4A:
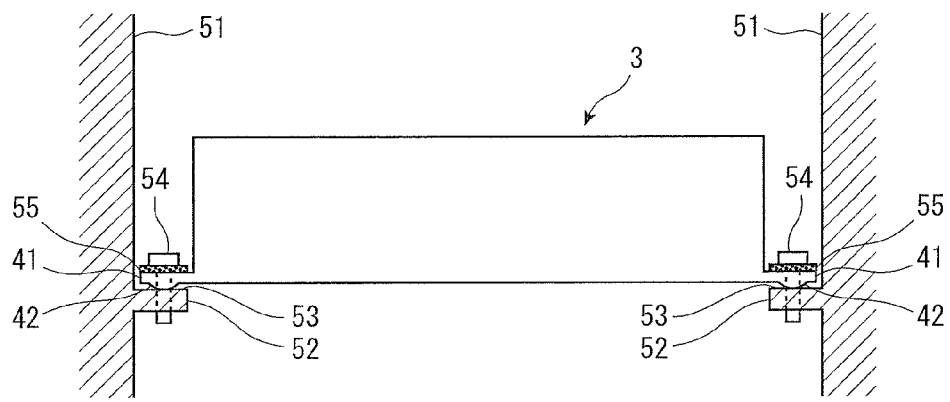
FIGS. 4A to 4C are exemplary views illustrating an example of a mounting manner of the second reading carriage to a document conveying device A in the document reading device according to the present invention.
Figure 4B:
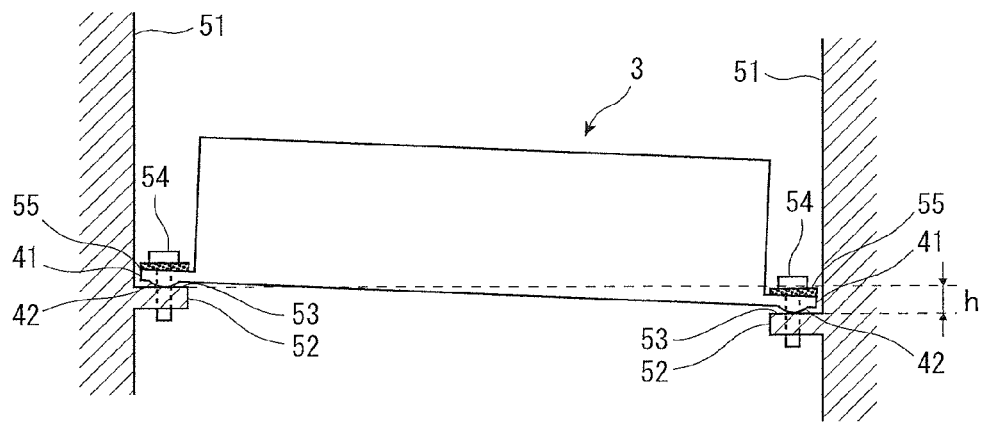
Figure 4C:
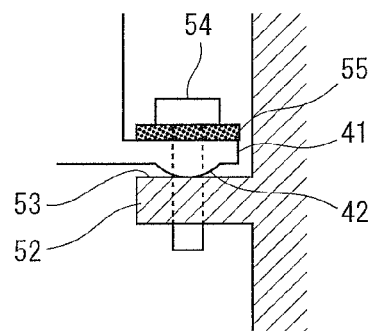

The following describes a mounting manner of the second reading carriage to the document conveying device A. FIGS. 4A to 4C are exemplary views illustrating an example of the mounting manner of the second reading carriage 3 to the document conveying device A.

As illustrated in FIGS. 4A to 4C, each of a pair of support frames (side plates) 51 provided along the document conveying direction of the document conveying device A has a support portion 52 that protrudes therefrom so as to support the second reading carriage 3. On the other hand, the second reading carriage 3 has a mounting portion 41 that abuts against the support portion 52 of the support frame 51 so as to be fixedly supported by the support portion 52. The mounting portion 41 is placed on the support portion 52 and is further fixed to the support portion 52 of the support frame 51 by a retaining member (e.g., a screw 54), whereby the second reading carriage 3 is fixed to the support frame 51.

The support portion 52 and mounting portion 41 illustrated in FIGS. 4A to 4C will be described more in detail using FIG. 5. The support portion 52 is provided at two positions of the support frame 51 along the document conveying direction. Hereinafter, the support portion 52 on the pivotal pin 82 side is referred to as "support portion 52A", and the support portion 52 on the sheet supply tray 10 side is referred to as "support portion 52B". The support portions 52A and 52B are provided in each of the pair of support frames 51. Similarly, as to the mounting portion 41 provided in the reading carriage 3, the mounting portions 41A and 41B are provided so as to correspond to the support portions 52A and 52B, respectively.

Referring back to FIGS. 4A to 4C, while a support surface 53 of the support portion (support portions 52A and 52B) assumes a flat surface, a mounting surface (supported surface) 42 of the mounting portion 41 (mounting portions 41A and 41B) of the second reading carriage 3 assumes a curved surface as illustrated in FIG. 4C. The curved surface is formed by a columnar surface (see (a) of FIG. 3) or by a spherical surface (see (b) of FIG. 3). When the mounting surface 42 is formed into the columnar surface, the mounting surface 42 and support surface 53 are brought into line contact. When the mounting surface 42 is formed into the spherical surface, the mounting surface 42 and support surface 53 are brought into point contact. An elastic member 55 such as a sponge is interposed as a cushioning member between the mounting portion 41 of the second reading carriage 3 and retaining member (screw 54). The elastic member 55 presses the second reading carriage 3 against the support portion 52 by its elastic force.

With the above configuration, even when a position of the support portion 52 is changed due to occurrence of distortion or twisting in the document conveying device A as illustrated in FIG. 4B, the second reading carriage 3 is supported by the curved surface of the mounting surface 42 in a tilted state, with the result that the positional change of the support portion 52 is allowed to thereby prevent the distortion or twisting from being transmitted to the second reading carriage 3. Further, the elastic member 55 interposed between the mounting portion and retaining member (screw 54) presses the second reading carriage 3 while absorbing an angle deviation between the second reading carriage 3 and retaining member (screw 54) generated due to tilting of the second reading carriage 3, thereby maintaining a stable fixing state of the second reading carriage 3. Thus, even when the second reading carriage 3 is tilted due to the positional change of the support portion 52, it is possible to prevent rattling and further to effectively prevent the distortion or twisting of the second reading carriage 3.

The mounting manner of the second reading carriage 3 to the document conveying device A will be described more specifically below. FIG. 5 is an exemplary cross-sectional view illustrating the mounting portion of the second reading carriage 3, and FIG. 6 is a perspective view illustrating the mounting portion of the second reading carriage 3.

Figure 5:
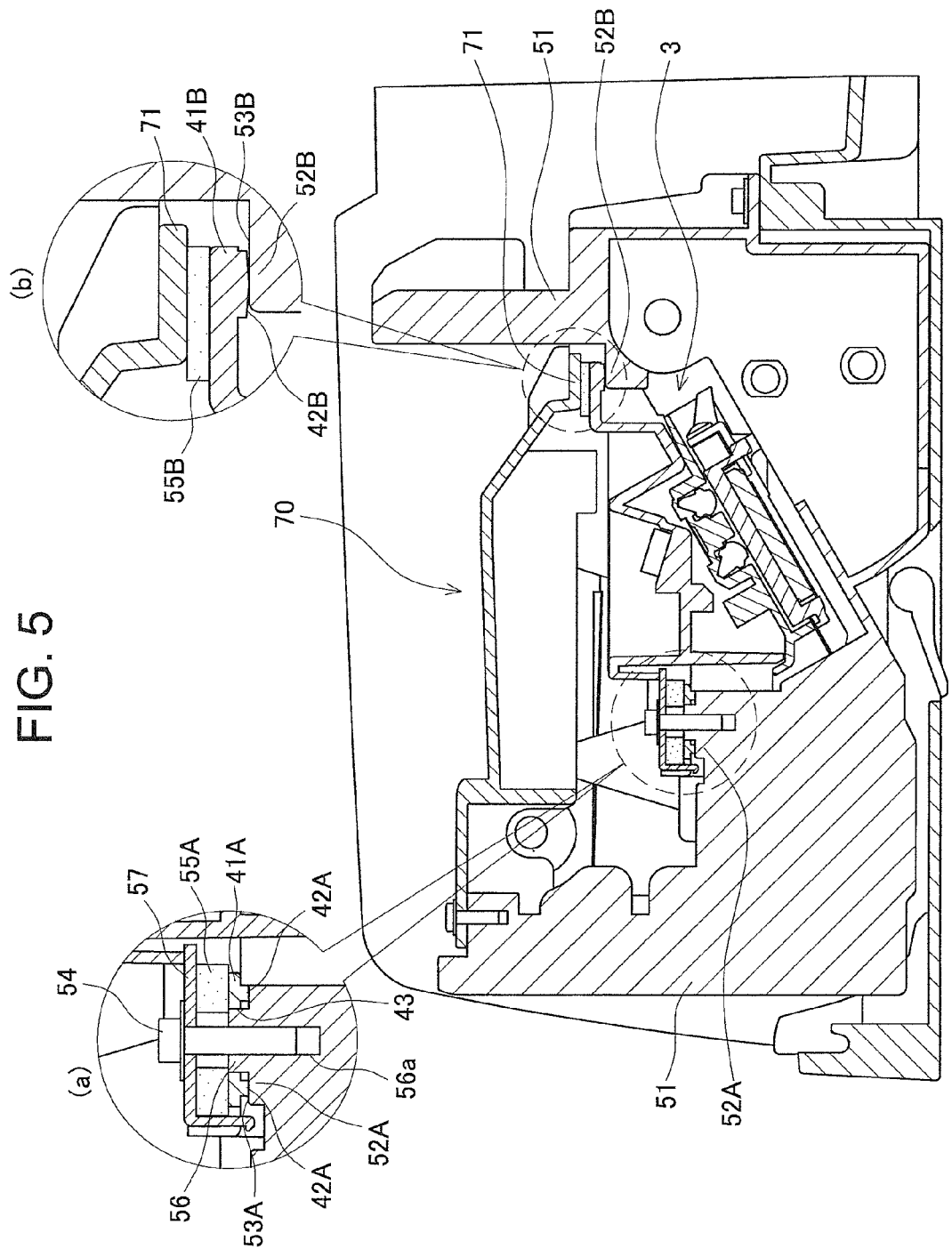
FIG. 5 is an exemplary cross-sectional view illustrating a mounting portion of the second reading carriage illustrated in FIG. 1.
Figure 6:
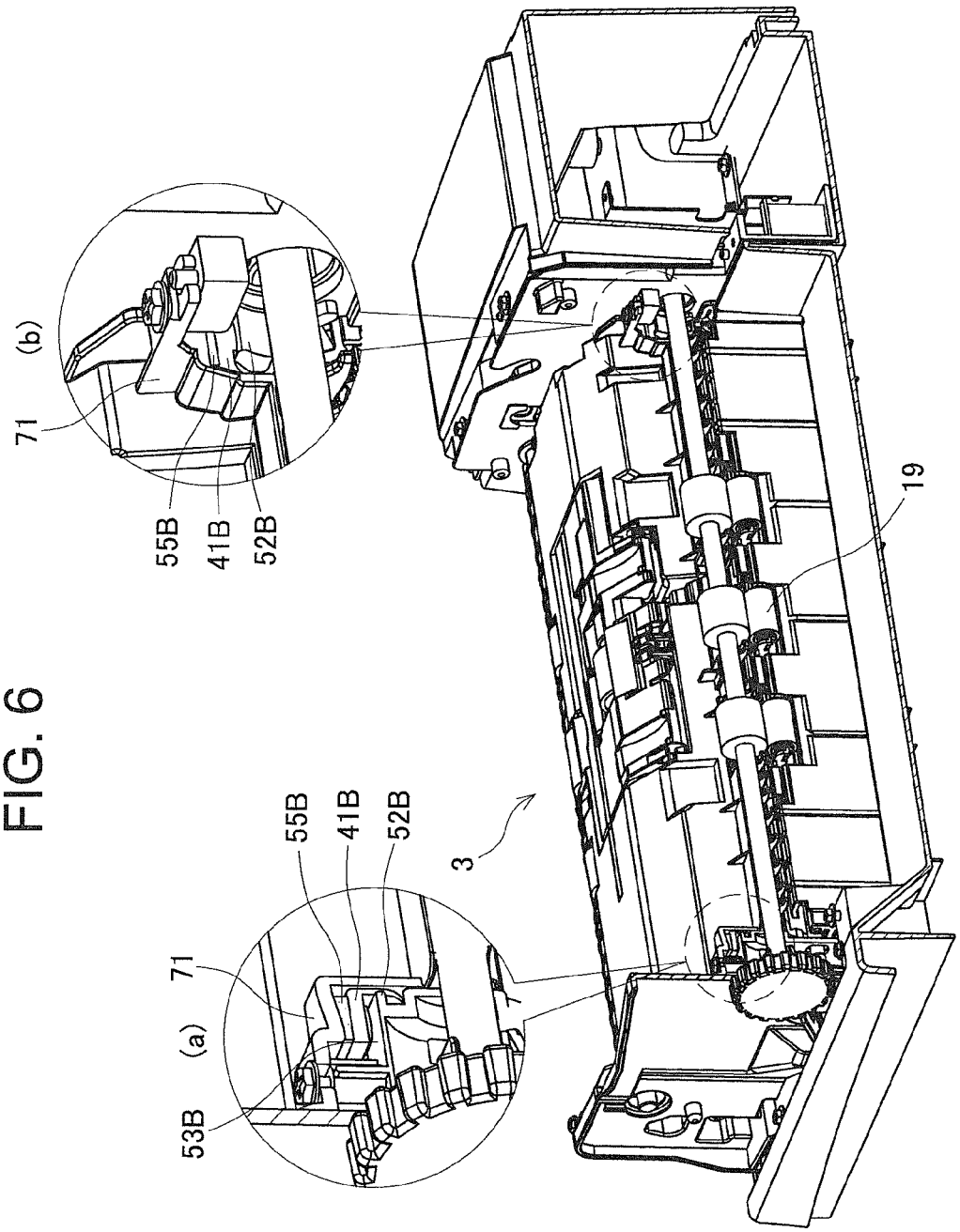
FIG. 6 is a perspective view illustrating the mounting portion of the second reading carriage illustrated in FIG. 1.

As illustrated in FIG. 5, the support portions 52A and 52B are disposed in each of the pair of support frames 51 of the document conveying device A at mounting positions of the second reading carriage 3. As described above, the support portion 52A is disposed on the hinge 82 side in a state where the sheet feed cover unit 80 is opened, and the support portion 52B is disposed on the sheet supply tray 10 side. A cylindrical positioning pin 56 for positioning the second reading carriage 3 is formed so as to protrude from the support portion 52A on the hinge 82 side. The positioning pin 56 is inserted through an insertion hole 43 (to be described later) formed in the mounting portion 41A of the second reading carriage 3 for positioning of the second reading carriage 3. A screw hole 56a to be screwed with the screw 54 is formed at a center of the positioning pin 56.

On the other hand, as illustrated in FIG. 3, the mounting portions 41A and 41B are disposed in the second reading carriage 3 at positions abutting against the support portions 52A and 52B of each of the pair of support frames 51. The mounting portion 41A disposed on one end side of the second reading carriage 3 in a short length direction thereof abuts against the support portion 52A of the support frame 51. A mounting surface 42A formed into a columnar surface is formed in a lower surface of the mounting portion 41A and is brought into line contact with the support surface 53A. Further, an insertion hole 43 for allowing insertion of the cylindrical positioning pin 56 of the support portion 52A therethrough is formed in the mounting portion 41A. As described above, it is possible to easily set the second reading carriage 3 to a predetermined position of the support frame 51 by means of the positioning pin 56 and the insertion hole 43.

Further, the mounting portion 41B disposed on the other end side of the second reading carriage 3 in the short length direction abuts against the support portion 52B of the support frame 51. A mounting surface 42B formed into a spherical surface is formed in a lower surface of the mounting portion 41B and is brought into point contact with the support surface 53B.

As illustrated in (a) of FIG. 5, on the mounting portion 41A side, after the positioning pin 56 is inserted through the insertion hole 43, an elastic member 55A is placed on the mounting portion 41A, then a pressing member 57 is placed on the elastic member 55A, and, finally, the above members are fixed by the screw 54 as the retaining member.

Further, as illustrated in (b) of FIG. 5, on the mounting portion 41B side, the mounting portion 41B is placed on the support portion 52B, then an elastic member 55B is placed on the mounting portion 41B, and the above-mentioned separation guide unit 70 is placed on the elastic member 55B. A retaining portion 71 that presses from above the mounting portion 41B to retain the second reading carriage 3 is formed at an end portion of the separation guide unit 70. That is, when the separation guide unit 70 is mounted, the mounting portion 41B is retained between the retaining portion and the support portion 52B.

Figure 7:
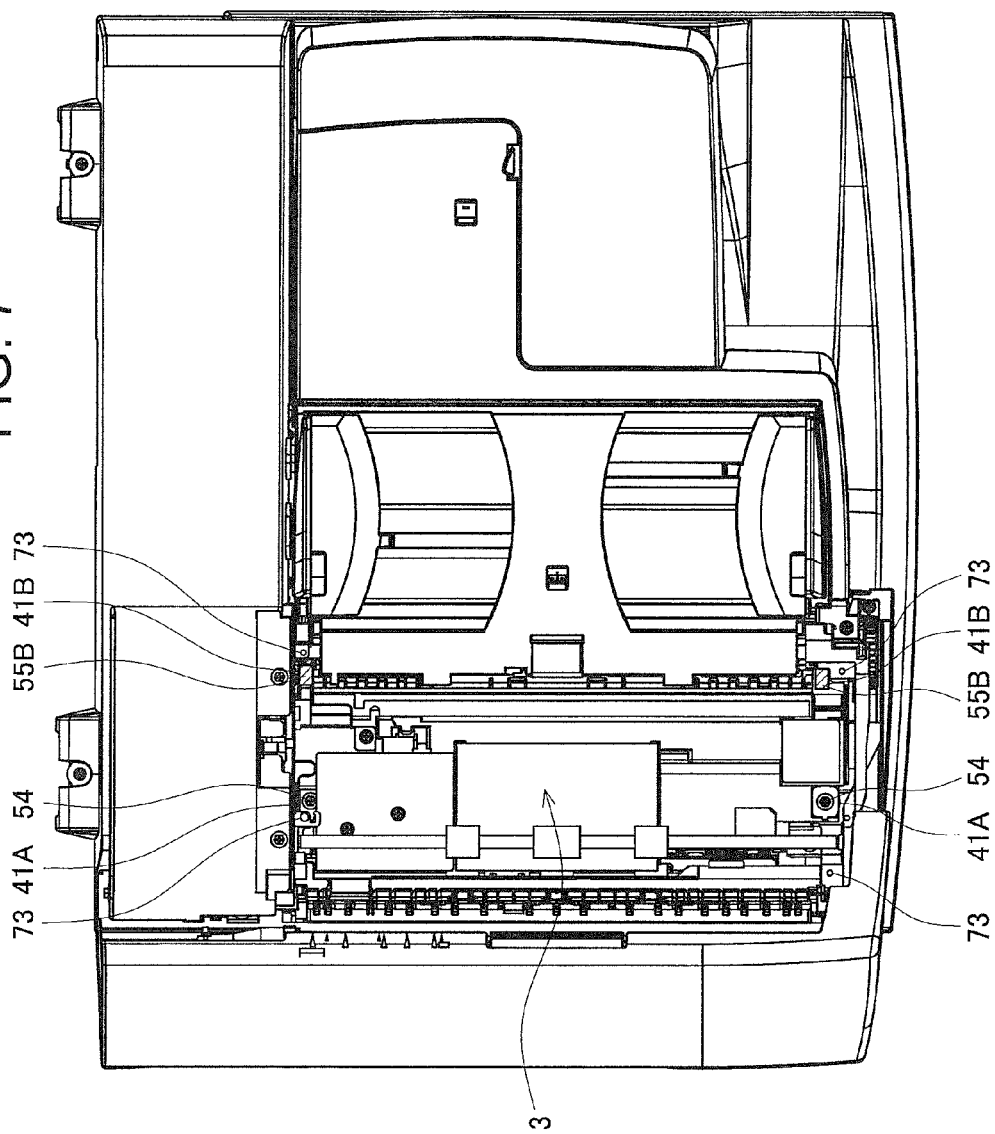
FIG. 7 is an exemplary top view illustrating the document reading device of FIG. 1 in a state where a sheet feed cover unit and a separation guide unit are removed.

FIG. 7 is a plan view illustrating the document reading device of FIG. 1 in a state where the sheet feed cover unit 80 and the separation guide unit 70 are removed, and FIG. 8 is a plan view illustrating the document reading device of FIG. 1 in a state where only the sheet feed cover unit 80 is removed (separation guide unit 70 is still mounted). As illustrated in FIG. 7, screw holes 73 for mounting the separation guide unit 70 are formed at positions different from the positions of the mounting portion 41 of the second reading carriage 3 and, as illustrated in FIG. 8, the separation guide unit 70 is fixed to the device frame by means of screws 74. As described above, the second reading carriage 3 is retained by being sandwiched between the retaining portion 71 of the separation guide unit 70 screw-fixed independently of the second reading carriage 3 and the support portion 52B, whereby it is possible to reliably fix the second reading carriage 3 and to reduce the labor and time for mounting and removal of the second reading carriage 3.

As described above, the one and the other ends of the second reading carriage 3 in the short length direction abut against the support portion 52 of the support frame 51 in a line contact manner and in a point contact manner, respectively, so that it is possible to prevent distortion or twisting, if occurs, in the document conveying device A from being transmitted to the second reading carriage 3.

In the above description, the support surface 53 of the support frame 51 is formed into a flat surface, and the mounting surface 42 of the second reading carriage 3 is formed into a curved surface; alternatively, a reverse configuration may be employed in which the support surface 53 of the support frame 51 is formed into a curved surface, and the mounting surface 42 of the second reading carriage 3 is formed into a flat surface. Even in this case, the same effect as in the above embodiment can be obtained.

Figure 9A:
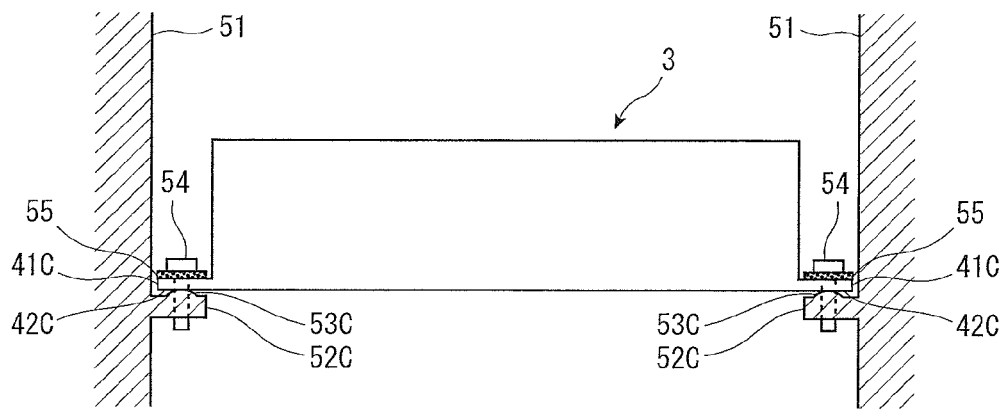
FIGS. 9A and 9B are exemplary views illustrating another example of the mounting manner of the second reading carriage to the document conveying device A in the document reading device according to the present invention.
Figure 9B:
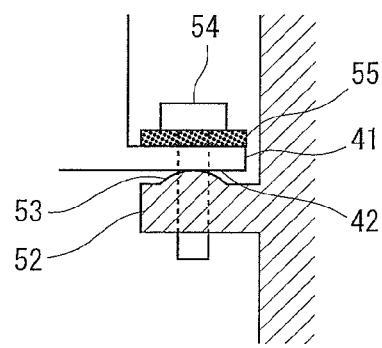
Figure 10A:
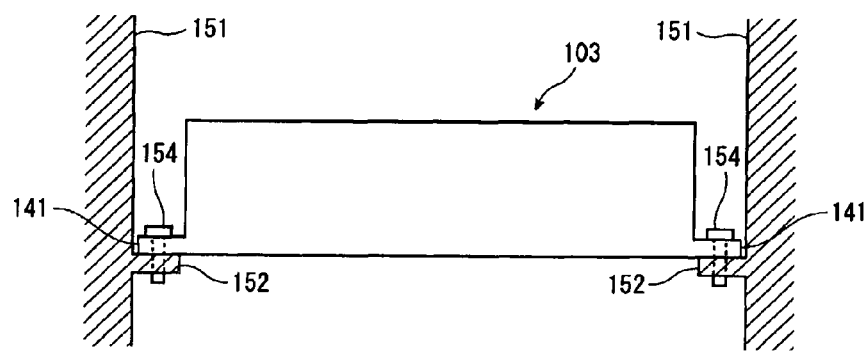
FIGS. 10A and 10B are exemplary views illustrating the mounting manner of the second reading carriage to the document conveying device in a conventional document reading device.
Figure 10B:
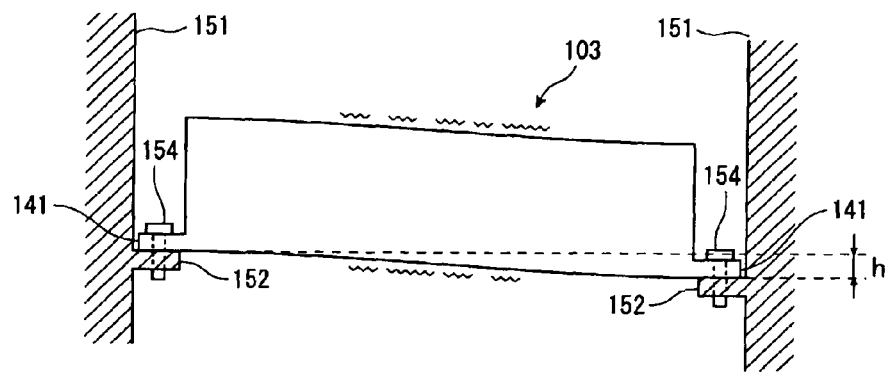

FIGS. 9A and 9B are exemplary views illustrating an example of the mounting manner of the second reading carriage 3 to the document conveying device A in the present invention when the support surface of the support frame 51 is formed into a curved surface. The same reference numerals are given to the same parts as in FIGS. 4A to 4C and a detailed description thereof will be omitted.

As illustrated in FIGS. 9A and 9B, the support frame 51 of the document conveying device A has a support portion 52C that protrudes therefrom so as to support the second reading carriage 3, and the second reading carriage 3 has a mounting portion 41C that abuts against the support portion 52C of the support frame 51 so as to be fixedly supported by the support portion 52C. The mounting portion 41C is placed on the support portion 52C and is further fixed to the support portion 52C of the support frame 51 by a retaining member (e.g., a screw 54), whereby the second reading carriage 3 is fixed to the support frame 51.

A mounting surface (supported surface) 42C of the second reading carriage 3 assumes a flat surface; on the other hand, the support surface 53C of the support portion 52C assumes a curved surface. The curved surface may be formed into a columnar surface so as to be brought into line contact with the mounting surface 42C or may be formed into a spherical surface so as to be brought into point contact with the mounting surface 42C. Further, an elastic member 55 such as a sponge is interposed as a cushioning member between the mounting portion 410 of the second reading carriage 3 and the retaining member (screw 54).

As described above in detail, according to the document reading device of the present invention, even when distortion or twisting occurs in the document conveying device, it is possible to stably retain the reading carriage of the document conveying device without transmitting the distortion or twisting to the reading carriage.

REFERENCE SIGNS LIST

A: Document conveying device (document conveying unit)
H: Document reading device main body (document reading unit)
2: First reading carriage
3: Second reading carriage
10: Sheet supply tray
11: Sheet discharge tray
12: U-shaped document conveying path
18: Conveying roller pair (first roller pair)
19: Discharge roller pair (second roller pair)
20: Third contact glass
36: Biasing member
37: Swing guide member
41, 41A, 41B, 41C: Mounting portion
42, 42A, 42B, 42C: Mounting surface (supported surface)
43: Insertion hole
51: Support frame (side plate)
52, 52A, 52B, 52C: Support portion
53, 53A, 53B, 53C: Support surface
54: Screw (retaining member)
55: Elastic member
56: Positioning pin
56a: Screw hole
70: Separation guide unit
71: Retaining portion (retaining member)

The invention claimed is:

1. A document reading device, comprising:
a sheet supply tray on which a document is placed;
a sheet discharge tray housing the document thereon;
a U-shaped document conveying path extending from the sheet supply tray to the sheet discharge tray;
a reading carriage arranged inside the U-shaped document conveying path and reading the document conveyed along the U-shaped document conveying path;
a mounting portion having a mounting surface and arranged on each end portion of the reading carriage perpendicular to a document conveying direction;
a pair of support frames arranged at two sides of the reading carriage in a document width direction;
a support portion having a support surface and arranged on each of the pair of support frames and abutted against the mounting portion to support the reading carriage;
an elastic member arranged to overlap with a rear surface of the mounting portion opposite to the mounting surface thereof abutting against the support portion; and
a retaining member sandwiching the mounting portion and the elastic member with the support portion of the support frame to retain the mounting portion and the elastic member therebetween,
wherein one of the support surface of the support portion abutted against the mounting portion and the mounting surface of the mounting portion abutting against the support surface of the support portion has a curved surface, and
the U-shaped document conveying path includes a sheet supply path through which the document is supplied from the sheet supply tray, and the retaining member is a guide member forming the sheet supply path.

2. The document reading device according to claim 1, wherein the retaining member is a fixing tool, the support portion has a fitting hole in which the fixing tool is fitted, and the mounting portion and the elastic member respectively have through holes through which the fixing tool passes.

3. The document reading device according to claim 1, further comprising a pressing member placed on the elastic member such that the retaining member uniformly presses a surface of the elastic member.

4. A document reading device, comprising:
a document conveying unit and a document reading unit,
the document conveying unit including:
a sheet supply tray on which a document is placed;
a sheet discharge tray that houses the document; and
a document conveying path that extends from the sheet supply tray to the sheet discharge tray and is formed to be opened or closed with respect to the document reading unit, and
the document reading unit including:
a first reading carriage that reads a surface of the document conveyed by the document conveying unit;
a second reading carriage that reads another surface of the document opposite to the surface read by the first reading carriage, and having a mounting portion;
a support frame having a support portion abutted against the mounting portion of the second reading carriage to support the second reading carriage;
an elastic member arranged on and overlapped with the mounting portion of the second reading carriage; and
a retaining member that retains the second reading carriage, the retaining member sandwiching the mounting portion of the second reading carriage and the elastic member with the support portion of the support frame,
wherein one of a support surface of the support portion of the support frame abutted against the mounting portion of the second reading carriage and a supported surface of the mounting portion of the second reading carriage abutting against the support surface of the support portion of the support frame has a curved surface,
the supported surface includes two columnar surfaces apart from each other and an insertion hole arranged between the two columnar surfaces, and
each of the two columnar surfaces is convexed outwardly toward the support surface of the support portion, and the retaining member is inserted in the insertion hole.

5. The document reading device according to claim 4, wherein the document reading unit further comprises a positioning pin for positioning the second reading carriage, and provided in the support frame, and the positioning pin is inserted through an insertion hole formed at an end portion of the second reading carriage in a short length direction thereof for positioning of the second reading carriage.

6. The document reading device according to claim 4, further comprising:
a first reading section that reads the document by means of the first reading carriage;
a second reading section that reads the document by means of the second reading carriage on a downstream side of the first reading section;
a first roller pair disposed between the first and second reading sections; and
a second roller pair disposed downstream of the second reading section,
wherein a conveying guide member that forms a document conveying path extending from the first roller pair to the second roller pair through the second reading section is provided in the second reading carriage.

7. The document reading device according to claim 6, wherein the conveying guide member includes a contact glass provided in the second reading carriage and a swing guide member disposed facing the contact glass and biased toward the contact glass by a biasing member.

8. The document reading device according to claim 4, wherein the document reading unit further comprises a pressing member placed on the elastic member such that the retaining member uniformly presses a surface of the elastic member.

9. A document reading device, comprising:
a reading carriage reading a document;
a support frame supporting the reading carriage;
a mounting portion having a mounting surface and arranged on the reading carriage;
a support portion having a support surface abutted against the mounting surface of the mounting portion and arranged on the support frame;
an elastic member arranged to overlap with a rear surface of the mounting portion opposite to the mounting surface thereof; and
a retaining member sandwiching the mounting portion and the elastic member with the support portion of the support frame to retain the mounting portion and the elastic member therebetween,
wherein one of the support surface of the support portion and the mounting surface of the mounting portion has a curved surface,
the mounting surface includes two columnar surfaces apart from each other, and the mounting portion includes an insertion hole arranged between the two columnar surfaces, and
each of the two columnar surfaces is convexed outwardly toward the support surface of the support portion, and the retaining member is inserted in the insertion hole.

10. The document reading device according to claim 9, wherein the retaining member is a cushioning member.

11. The document reading device according to claim 9, wherein a positioning pin for positioning the read carriage is formed on the support frame, and the read carriage includes an insertion hole through which the positioning pin is inserted.

12. The document reading device according to claim 9, further comprising a pressing member placed on the elastic member such that the retaining member uniformly presses a surface of the elastic member.

* * * * *